(12) United States Patent
Rousseaux (10) Patent No.: US 10,317,639 B2
(45) Date of Patent: Jun. 11, 2019

(54) FIBER OPTIC NETWORK ARCHITECTURE (71) Applicant: CommScope Connectivity Belgium BVBA, Kessel-Lo (BE)

(72) Inventor: Olivier Hubert Daniel Yves Rousseaux, Brussels (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 15/809,631

(22) Filed: Nov. 10, 2017

(65) Prior Publication Data

US 2018/0136426 A1   May 17, 2018

Related U.S. Application Data (60) Provisional application No. 62/420,597, filed on Nov. 11, 2016.

(51) Int. Cl.
*G02B 6/44* (2006.01)

(52) U.S. Cl.
CPC .................. *G02B 6/4471* (2013.01)

(58) Field of Classification Search
None
See application file for complete search history.

(56) References Cited

U.S. PATENT DOCUMENTS

| | | | |
|---|---|---|---|
| 5,125,060 A | 6/1992 | Edmundson | |
| 5,657,413 A | 4/1997 | Ray et al. | |
| 7,006,739 B2 | 2/2006 | Elkins, II et al. | |
| 7,016,592 B2* | 3/2006 | Elkins, II | G02B 6/4472 385/100 |
| 7,088,893 B2 | 8/2006 | Cooke et al. | |
| 7,113,679 B2 | 9/2006 | Melton et al. | |
| 7,127,143 B2 | 10/2006 | Elkins, II et al. | |
| 7,155,093 B2 | 12/2006 | Elkins, II et al. | |
| 7,184,633 B2 | 2/2007 | Cooke et al. | |
| 7,197,214 B2 | 3/2007 | Elkins, II et al. | |
| 7,228,036 B2 | 6/2007 | Elkins, II et al. | |
| 7,266,274 B2 | 9/2007 | Elkins, II et al. | |
| 7,277,614 B2 | 10/2007 | Cody et al. | |
| 7,317,863 B2* | 1/2008 | Lu | G02B 6/4472 385/103 |
| 7,330,621 B2 | 2/2008 | Elkins, II et al. | |

(Continued)

FOREIGN PATENT DOCUMENTS

| | | |
|---|---|---|
| EP | 1981185 A1 | 10/2008 |
| JP | H1032545 A | 2/1998 |

(Continued)

OTHER PUBLICATIONS

International Search Report and Written Opinion of the International Searching Authority, PCT/US2017/059528, dated Feb. 21, 2018, 16 pages.

(Continued)

*Primary Examiner* — Rhonda S Peace (74) *Attorney, Agent, or Firm* — Merchant & Gould P.C.

(57) ABSTRACT

The present disclosure relates to a fiber optic network architecture that uses a factory manufactured break-out cable as a backbone for supporting a chain or chains of indexing optical components that branch outwardly from the factory manufactured break-out cable so as to extend the reach of a fiber optic network.

15 Claims, 10 Drawing Sheets

(56) References Cited

U.S. PATENT DOCUMENTS

| | | | | |
|---|---|---|---|---|
| 7,333,708 B2* | 2/2008 | Blackwell, Jr. | ...... | G02B 6/4441 385/134 |
| 7,346,243 B2 | 3/2008 | Cody et al. | | |
| 7,349,605 B2* | 3/2008 | Noonan | ............ | G01M 11/33 385/100 |
| 7,391,950 B2 | 6/2008 | Lewallen et al. | | |
| 7,450,804 B2 | 11/2008 | Elkins, II et al. | | |
| 7,596,294 B2 | 9/2009 | Knecht et al. | | |
| 7,609,923 B2* | 10/2009 | Baucom | ............ | G02B 6/4475 385/100 |
| 7,658,549 B2 | 2/2010 | Elkins, II et al. | | |
| 7,660,501 B2 | 2/2010 | Elkins, II et al. | | |
| 7,693,374 B2 | 4/2010 | Cody et al. | | |
| 7,729,583 B2 | 6/2010 | Elkins, II et al. | | |
| 7,744,288 B2 | 6/2010 | Lu et al. | | |
| 8,041,178 B2* | 10/2011 | Lu | ............ | G01M 11/33 385/147 |
| 8,249,450 B2* | 8/2012 | Conner | ............ | G02B 6/4452 398/141 |
| 8,582,938 B2 | 11/2013 | Cody et al. | | |
| 8,737,837 B2* | 5/2014 | Conner | ............ | G02B 6/4452 398/66 |
| 8,761,559 B1 | 6/2014 | Cody et al. | | |
| 9,049,500 B2* | 6/2015 | Conner | ............ | H04B 10/27 |
| 9,097,873 B2* | 8/2015 | Conner | ............ | G02B 6/4471 |
| 9,188,759 B2* | 11/2015 | Conner | ............ | G02B 6/4452 |
| 9,207,421 B2* | 12/2015 | Conner | ............ | G02B 6/4452 |
| 9,348,096 B2 | 5/2016 | Kmit et al. | | |
| 9,482,840 B2* | 11/2016 | Conner | ............ | G02B 6/4475 |
| 9,557,498 B2* | 1/2017 | Loeffelholz | ............ | G02B 6/3895 |
| 9,766,414 B2* | 9/2017 | Marcouiller | ............ | G02B 6/3879 |
| 9,874,713 B2* | 1/2018 | Marcouiller | ............ | G02B 6/4444 |
| 9,989,705 B2* | 6/2018 | Jensen | ............ | G02B 6/2808 |
| 2006/0233506 A1* | 10/2006 | Noonan | ............ | G01M 11/33 385/134 |
| 2006/0269208 A1* | 11/2006 | Allen | ............ | G02B 6/3878 385/135 |
| 2008/0170828 A1* | 7/2008 | Elkins | ............ | G02B 6/4436 385/95 |
| 2009/0317047 A1 | 12/2009 | Smith et al. | | |
| 2010/0092129 A1* | 4/2010 | Conner | ............ | G02B 6/4452 385/17 |
| 2010/0092133 A1* | 4/2010 | Conner | ............ | G02B 6/4452 385/39 |
| 2010/0092146 A1* | 4/2010 | Conner | ............ | G02B 6/4452 385/135 |
| 2010/0092169 A1* | 4/2010 | Conner | ............ | G02B 6/4452 398/43 |
| 2010/0092171 A1* | 4/2010 | Conner | ............ | G02B 6/4452 398/49 |
| 2010/0303408 A1* | 12/2010 | Conner | ............ | G02B 6/4475 385/24 |
| 2010/0316390 A1 | 12/2010 | Almog | | |
| 2012/0128311 A1 | 5/2012 | Bolster et al. | | |
| 2013/0034336 A1 | 2/2013 | Cassell et al. | | |
| 2013/0216187 A1* | 8/2013 | Dowling | ............ | H04Q 11/0003 385/71 |
| 2014/0161402 A1 | 6/2014 | Cunningham | | |
| 2014/0241680 A1 | 8/2014 | Cody et al. | | |
| 2014/0254986 A1* | 9/2014 | Kmit | ............ | H04Q 11/0067 385/55 |
| 2014/0294390 A1 | 10/2014 | Badinelli | | |
| 2017/0212321 A1* | 7/2017 | Gronvall | ............ | G02B 6/4452 |
| 2018/0088287 A1* | 3/2018 | Marcouiller | ............ | G02B 6/4471 |
| 2018/0100974 A1* | 4/2018 | Loeffelholz | ............ | G02B 6/4472 |
| 2018/0136426 A1* | 5/2018 | Rousseaux | ............ | G02B 6/4471 |
| 2018/0164514 A1* | 6/2018 | Kmit | ............ | H04J 14/0205 |

FOREIGN PATENT DOCUMENTS

| | | |
|---|---|---|
| WO | 2011051930 A1 | 5/2011 |
| WO | 2013149150 A1 | 10/2013 |
| WO | 2014190281 A1 | 11/2014 |
| WO | 2015200826 A1 | 12/2015 |
| WO | 2016043922 A1 | 3/2016 |
| WO | 2016057411 A1 | 4/2016 |
| WO | 2016132216 A1 | 8/2016 |
| WO | 2016139734 A1 | 9/2017 |

OTHER PUBLICATIONS

International Search Report and Written Opinion of the International Searching Authority, PCT/US2016/019621, dated Jun. 29, 2016, 12 pages.

\* cited by examiner

FIBER OPTIC NETWORK ARCHITECTURE

CROSS-REFERENCE TO RELATED APPLICATIONS

This application claims the benefit of priority to U.S. Provisional Patent Application No. 62/420,597 filed Nov. 11, 2016, the disclosure of which is hereby incorporated by reference in its entirety.

TECHNICAL FIELD

The present disclosure relates generally to fiber optic communications networks. More particularly, the present disclosure relates to network architectures for fiber optic communications networks.

BACKGROUND

Optical networks are becoming increasingly more prevalent in part because service providers want to deliver high bandwidth communication capabilities to customers. There is a need for advanced fiber optic network architectures for more effectively and efficiently extending fiber optic networks to an ever increasing number of customers.

SUMMARY

Aspects of the present disclosure relate to a fiber optic network architecture that uses a factory manufactured break-out cable as a backbone for supporting a chain or chains of indexing optical components that branch outwardly from the factory manufactured break-out cable so as to extend the fiber optic network.

In one aspect, a system for building an architecture for a fiber optic network includes a factory manufactured fiber optic break-out cable including a main fiber distribution cable and a plurality of factory integrated mid-span access locations positioned along the length of the main fiber distribution cable. The mid-span access locations include demateable fiber optic connection locations. A plurality of indexing components are adapted to be daisy chained together to form a chain of indexing components and are adapted to be optically coupled to one or more of the demateable fiber optic connection locations at one or more of the mid-span access locations of the factory manufactured break-out cable.

In another aspect, a fiber optic network includes a factory manufactured fiber optic break-out cable including a main fiber distribution cable and a plurality of factory integrated mid-span access locations positioned along the length of the main fiber distribution cable. The mid-span access locations include demateable fiber optic connection locations. A plurality of indexing components are daisy chained together to form a chain of indexing components, the chain of indexing components having a first end optically coupled to one of the demateable fiber optic connection locations at one of the mid-span access locations of the factory manufactured break-out cable.

A variety of additional aspects will be set forth in the description that follows. These aspects can relate to individual features and to combinations of features. It is to be understood that both the forgoing general description and the following detailed description are exemplary and explanatory only and are not restrictive of the broad concepts upon which the examples disclosed herein are based.

DETAILED DESCRIPTION

Aspects of the present disclosure relate to a fiber optic network including a factory manufactured break-out cable that provides a backbone for supporting a network or arrangement of chained indexing components that branch from the break-out cable. The factory manufactured break-out cable can be provided with a plurality of factory manufactured break-out locations. The factory manufactured break-out locations can be provided at mid-span locations of the factory manufactured break-out cable and in certain examples can be protected by an over mold, by a heat shrink sealing component, by a shell or by other sealing techniques. The chains of indexing components can interface with the factory manufactured break-out cable at the factor-manufactured break-out locations. The indexing components can interface either directly or indirectly with the factory manufactured break-out locations. Example factory manufactured break-out cables are disclosed by U.S. Pat. Nos. 5,657,413; 8,041,178; and 7,127,143, all of which are incorporated by reference herein in their entireties.

An example factory manufactured break-out cable can include a main distribution cable having a plurality of optical fibers extending along the length of the distribution cable. In the factory, a jacket of the distribution cable is opened at mid-span access locations to access optical fibers of the distribution cable. At the mid-span access locations, the optical fibers are cut and typically connected to demateable fiber optic connection locations. The demateable fiber optic connection locations can include fiber optic connectors such as single-fiber fiber optic connectors or multi-fiber fiber optic connectors. In certain examples, the fiber optic connectors can be ruggedized and adapted for outdoor use. In certain examples, the fiber optic connectors can be mounted at the end of tether cables secured to the main distribution cable. The fiber optic connectors can include male fiber optic connectors or female fiber optic connectors. The demateable fiber optic connection locations can also include ports integrated enclosures sealing the mid-span access locations (e.g., ports integrated within overmolded bodies which form sealing closures over the mid-span access locations). The ports can be adapted for receiving fiber optic connectors such ruggedized fiber optic connectors. As indicated above, the midspan access locations can be sealed at the factory by techniques such as over-molding a closure over the mid-span access location. Generally, heat shrink seals or other sealing technologies can be utilized.

In certain examples, the factory manufactured break-out cable can be pre-engineered. For example, prior to manufacturing the break-out cable, the intended installation site can be surveyed so as to identify the exact locations where break-outs are desired. The break-out locations may correspond to street locations, building locations, subdivision locations, multi-dwelling unit locations, hand-hole locations, cabinet locations, pedestal locations, antenna locations, business locations, subscriber locations, street intersection locations, or other pre-existing locations at the intended installation site where it may be desirable to provide a fiber break-out for access to optical fiber lines. Based on the survey, the factory manufactured break-out cable can be custom made with the break-outs located at specific mid-span locations of the distribution cable corresponding to the surveyed break-out locations. In other examples, the factory manufactured break-out cable can be manufactured with the mid-span break-out locations positioned at specific intervals or in a repeating pattern that may or may not be related to surveyed information relating to a particular installation site location. Factory manufactured break-out cable can include cable having generically positioned break-out locations (e.g., uniform spacings between break-outs, a repeating spacing pattern, etc.), custom cable having customer specified break-out locations, and pre-engineered cable having break-out locations defined by specifications from a pre-conducted survey of the installation site.

As used herein, a ruggedized fiber optic connector is a fiber optic connector that is more robustly designed than a traditional indoor fiber optic connector such as an SC style fiber optic connector or an LC style fiber optic connector. Ruggedized fiber optic connectors are typically suitable for outdoor use. Ruggedized fiber optic connectors can include single-fiber fiber optic connectors and multi-fiber fiber optic connectors. Ruggedized multi-fiber optic connectors can be referred to as HMFOC connectors (e.g., hardened multi-fiber fiber optic connectors). Certain ruggedized fiber optic connectors in accordance with the principles of the present disclosure are designed to be capable of withstanding pull-out loads greater than 25 lbs. or greater than 50 lbs. when secured to corresponding ruggedized fiber optic connectors or when secured within corresponding ruggedized fiber optic connector ports. Certain ruggedized fiber optic connectors in accordance with the principles of the present disclosure can include rotatable (i.e., twist-to-lock) coupling element (i.e., couplers, fasteners, sleeves, collars, retainers, etc.) for securing the ruggedized connectors within their corresponding connector ports or for securing the ruggedized connectors to corresponding ruggedized connectors. Example rotatable coupling elements include threaded elements (e.g., threaded nuts, threaded sleeves, etc.) and bayonet-style elements. Certain ruggedized connectors may also include snap-fit coupling elements and sliding lock clips that function as coupling elements. Ruggedized fiber optic connectors in accordance with the principles of the present disclosure can also include seals for sealing with their respective connector ports or for sealing between respective ruggedized male and female fiber optic connectors when such fiber optic connectors are coupled together.

As used herein, demateable fiber optic connection locations often include ferrules supporting optical fibers. The ferrules can include single-fiber ferrules (e.g., cylindrical ferrules such as LC or SC ferrules) for supporting optical fibers corresponding to single-fiber optical connectors. Multi-fiber demateable fiber optic connection locations within the principles of the present disclosure can also include multi-fiber ferrules for supporting a plurality of optical fibers. Example multi-fiber fiber optic ferrules include 12 fiber ferrules such as MPO ferrules which support optical fibers in a sequence such as in a row. It will be appreciated that multi-fiber ferrules can support different numbers of optical fibers such as two fibers, four fibers, eight fibers, twelve fibers, twenty-four fibers, thirty-six fibers, forty-eight fibers or more fibers. In certain examples, the optical fibers can be arranged sequentially one row, two rows or more than two rows. In other examples, ferrule-less demateable fiber optic connection structures can be used. Example ferrule-less demateable fiber optic connection locations are disclosed by PCT Publication No. WO 2016/043922, which is hereby incorporated by reference in its entirety.

In certain examples, after a factory manufactured break-out cable has been manufactured, the factory manufactured break-out cable is wrapped on a spool and delivered to the field for deployment. During installation, the break-out cable is pulled off the spool and routed in the field along the pre-determined installation route. Thus, at the time of installation, the break-out locations have been pre-manufactured into the cable design. This type of arrangement is advantageous since it is not necessary to cut the cable jacket, make fiber splices or seal mid-span access locations in the field. This can greatly assist in improving installation times and can enhance reliability.

In certain examples, a factory manufactured break-out cable is used to extend a fiber optic network outwardly from a node or other conglomeration point in the network. Example conglomeration points can include fiber distribution hubs, cabinets, pedestals, enclosures or other structure. Fiber distribution hubs typically include optical power splitting capabilities and often include patch panels or other structures including demateable fiber optic connections for allowing subscribers to be connected to the network or disconnected from the network, and/or to allows subscribers to selectively be provided with different (e.g., upgraded, higher speed, specialty, etc.) service options. In certain other examples, the factory manufactured break-out cable can extend directly from a more central location such as a central office, head end or from other similar location.

Aspects of the present disclosure also relate to using indexing components to extend a fiber optic network outwardly from a field-installed factory manufactured break-out cable. A typical indexing component includes first and second demateable multi-fiber connection locations. Each of the demateable multi-fiber connection locations can include a plurality of optical fiber positions arranged in a sequence. In a preferred example, the optical fibers at the demateable fiber optic connection locations are retained in a particular fiber position sequence by a ferrule. In certain examples, the ferrule can include a two-fiber ferrule, an eight-fiber ferule, a twelve fiber MPO ferrule, a twenty-four fiber ferrule or other ferrules. While ferrules are preferred, ferrule-less systems are also contemplated. Within the indexing component, indexing optical fibers are routed from the first demateable multi-fiber connection location to the second demateable multi-fiber connection location in an indexed configuration. The indexed optical fibers are indexed such that first ends of the optical fibers at the first demateable multi-fiber connection location are at different sequential fiber positions compared to second ends of the optical fibers at the second demateable multi-fiber connection location. Within the indexing component one or more of the sequential fiber positions of the first multi-fiber demateable fiber optic location are not optically connected to any of the sequential fiber positions of the second demateable multi-fiber fiber optic connection location, but instead are optically connected to one or more drop locations by one or more drop optical fibers. The one or more drop locations can each include demateable fiber optic connections for interfacing with additional cables (e.g., drop cables) and components (e.g., terminals such as multi-service terminals, splitter terminals, wavelength division mulit-plexer (WDM) terminals, etc.). Similarly, one or more of the sequential fiber positions of the second demateable multi-fiber connection location are not optically connected to any of the sequential fiber positions of the first demateable multi-fiber connection location, but instead are optically coupled to one or more drop locations by one or more drop optical fibers. The one or more drop locations can each include demateable fiber optic connections for interfacing with additional cables (e.g., drop cables) and components (e.g., terminals such as multi-service terminals, splitter terminals, wavelength division mulit-plexer (WDM) terminals, etc.).

The drop fiber or fibers routed from the first demateable multi-fiber connection location can be referred to as forward drop fiber or forward drop fibers and the drop fiber or fibers routed from the second demateable multi-fiber connection location can be referred to as a reverse drop fiber or reverse drop fibers. It will be appreciated that it is preferred to include forward and reverse drop route fibers, but in certain examples only a forward drop fiber or only a reverse drop fiber may be provided. In certain examples, the forward and/or reverse drop fibers can be routed to single-fiber demateable connection locations. In other examples, where a plurality of forward and/or reverse drop fibers are provided, the drop fibers can be routed to multi-fiber demateable fiber optic connection locations or to a plurality of separate single-fiber demateable fiber optic connection locations. In still other examples, forward and/or reverse drop optical fibers can be routed to optical splitters that split the optical liners into a plurality of optical lines that can be routed to individual demateable fiber optic connection locations or to one or more multi-fiber demateable fiber optic connection locations. The demateable fiber optic connection locations can be ruggedized or non-ruggedized. Additionally, the demateable fiber optic connection locations can be provided as male or female fiber optical connectors terminating the end of tether cables, or as demateable fiber optic connection locations incorporated within ports of a terminal housing adapted for receiving fiber optic connectors. Example configurations for ruggedized single-fiber fiber optic ports/adapters as well as ruggedized single-fiber fiber optic connectors are disclosed by U.S. Pat. No. 7,744,288, which is hereby incorporated by reference in its entirety. Example multi-fiber connection locations with hardened multi-fiber fiber optic connectors are disclosed by International Application No. PCT/US2014/039377, which is hereby incorporated by reference. Example indexing configurations and indexing components are disclosed by U.S. Pat. No. 9,348,096, which is hereby incorporated by reference in its entirety.

Indexing components in accordance with the principles of the present disclosure can include housings defining fiber optic connection ports incorporating demateable single fiber and/or multi-fiber connection locations. In other examples, indexing components in accordance with principles of the present disclosure can include more cable-based constructions having fan-outs configured to fan out optical fibers from a main cable to a plurality of cables or tethers with the cables being terminated at their ends by male or female demateable multi-fiber connection locations.

Figure 1:
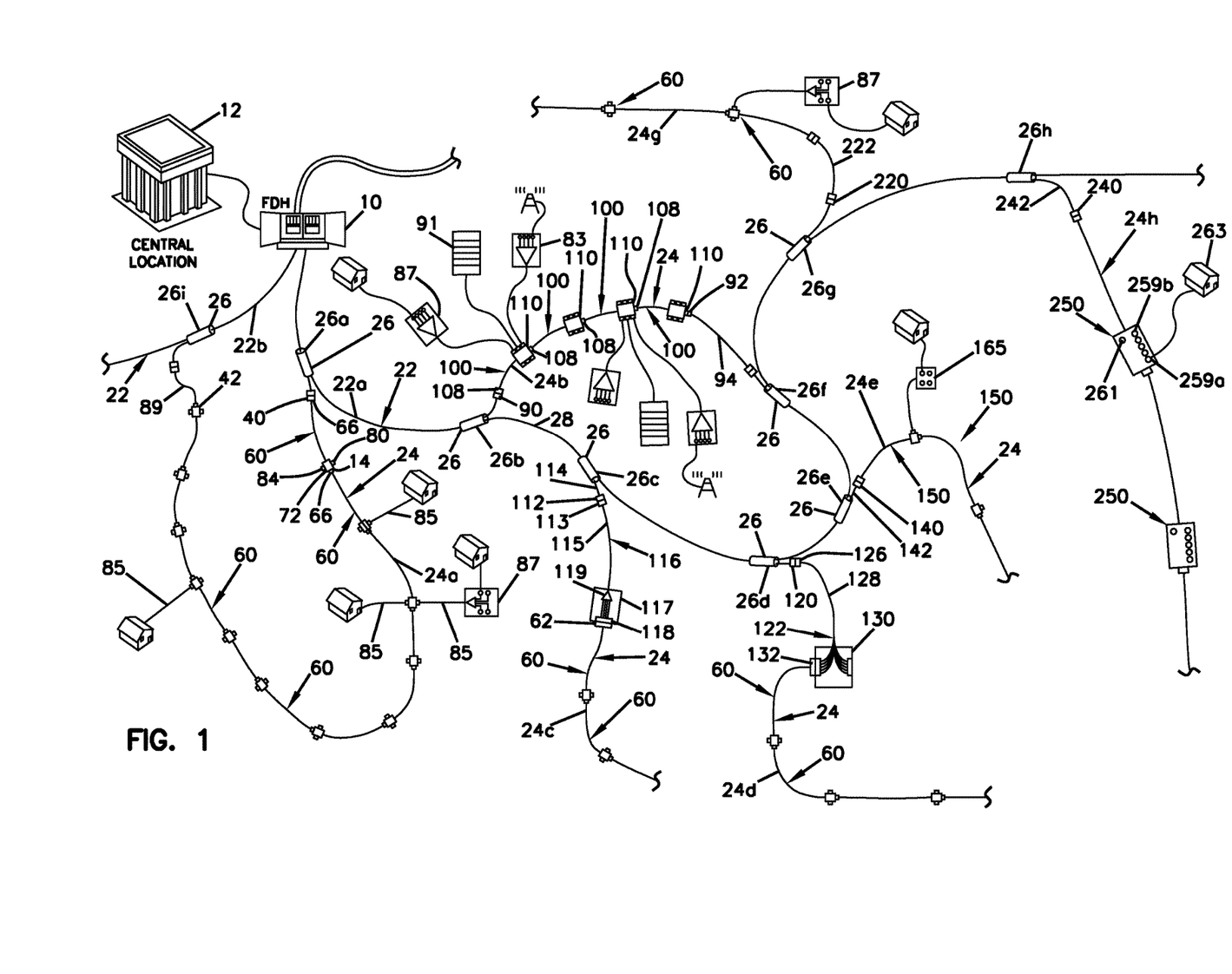
FIG. 1 illustrates a fiber optic network architecture in accordance with the principles of the present disclosure.

FIG. 1 depicts a fiber optic network having architecture in accordance with the principles of the present disclosure. It will be appreciated that the network can be adapted for distributing fiber optic communication capabilities outwardly from a central location toward an edge of the network. Typically, subscriber locations are provided at or near the outer edge of the network. The network can include one or more factory manufactured break-out cables (referenced generally by reference number 22) and one or more indexing component chains (referenced generally by reference number 24) that branch outwardly from the break-out cable or cables 22. In the depicted example, two factory manufactured break-out cables 22a, 22b are depicted as part of the network. Additionally, seven indexing component chains 24a-24i are depicted interfacing with the break-out cables 22a, 22b. It will be appreciated that the indexing component chains 24 can interface directly or indirectly with the break-out cables 22.

In the example depicted in FIG. 1, the break-out cable 22a is shown as having eight factory manufactured break-out locations 26a-26h and the break-out cable 22b is shown as having a break-out location 26i. The break-out locations 26a-26i (referenced generally by reference number 26) can also be referred to as mid-span access locations. It will be appreciated that the number and spacing of the break-out locations 26 can vary from network to network. In certain examples, more generic break-out cables 22 can be used that have a standard, constant, repeating or generic spacing between the break-out locations 26. In other examples, the break-out cables 22 can be pre-engineered with customized spacings provided between the break-out locations 26 with the spacings being established by an advanced survey of the proposed installation site. Thus, for pre-engineered break-out cables, the spacings between the break-out locations 26 will vary so that during installation of the break-out cables, the break-out locations are at or in close proximity to various desired drop locations of the deployment site. Additionally, it will be appreciated that the number and type of indexing component chains utilized in the network vary from installation to installation. The various types of indexing component chains depicted in FIG. 1 are just examples of different types of indexing chains that can be utilized in different combinations within a network.

The break-out locations 26 preferably include demateable fiber optic connection locations. In certain examples, the demateable fiber optic locations can include single fiber or multi-fiber mateable fiber optic locations. In certain examples, the demateable fiber optic connection locations can include single-fiber fiber optic connectors or multi-fiber fiber optic connectors. The fiber optic connectors can be male fiber optic connectors or female fiber optic connectors. The fiber optic connectors can be mounted on tethers or secured to an enclosure corresponding to the break-out location. In certain examples, the single fiber or multi-fiber demateable fiber optic connection locations can be provided in ports defined by a housing or enclosure. The demateable multi-fiber or single-fiber connection locations can be ruggedized. The break-out locations 26 are provided at mid-span locations along the length of a main distribution cable 28.

Figure 7:
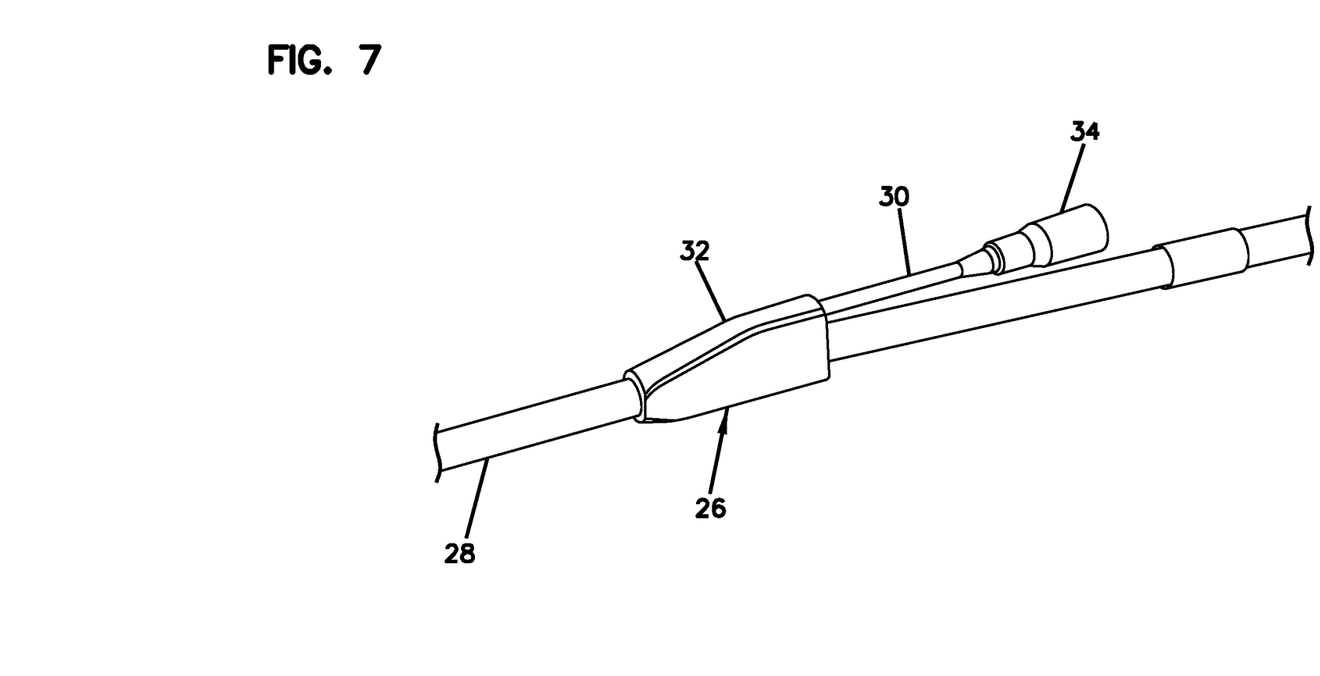
FIG. 7 illustrates an example tether-style break-out configuration that can be used as part of a break-out cable incorporated into the network of FIG. 1.

FIG. 7 shows an example of a break-out location 26 including a tether 30 containing one or more optical fibers that are optically coupled (e.g., spliced or integrally connected) to one or more optical fibers routed through the distribution cable 28. An interface between the tether 30 and the distribution cable 28 is factory enclosed by a closure 32 such as an overmolded closure or a heat-shrink based closure. A base end of the tether can be anchored to the main distribution cable 28. A free end of the tether 30 is terminated by a demateable fiber optic connection location adapted for allowing optical connection to the one or more optical fibers routed through the tether 30. The demateable single-fiber or multi-fiber optical connection location is depicted as a fiber optic connector 34 mounted at the free end of the tether 30. It will be appreciated that where the tether 30 carries a single optical fiber, the fiber optic connector 34 can be a single-fiber fiber optic connector. In contrast, where the tether 30 includes a plurality of optical fibers, the fiber optic connector 34 can be a multi-fiber fiber optic connector. It will be appreciated that the fiber optic connector 34 can be male or female. Additionally, the fiber optic connector 34 can be a ruggedized fiber optic connector. The fiber optic connector 34 is adapted for mating with another fiber optic connector for allowing an optical component (e.g., an indexing component) to be coupled to the optical fiber or fibers of the tether.

Figure 8:
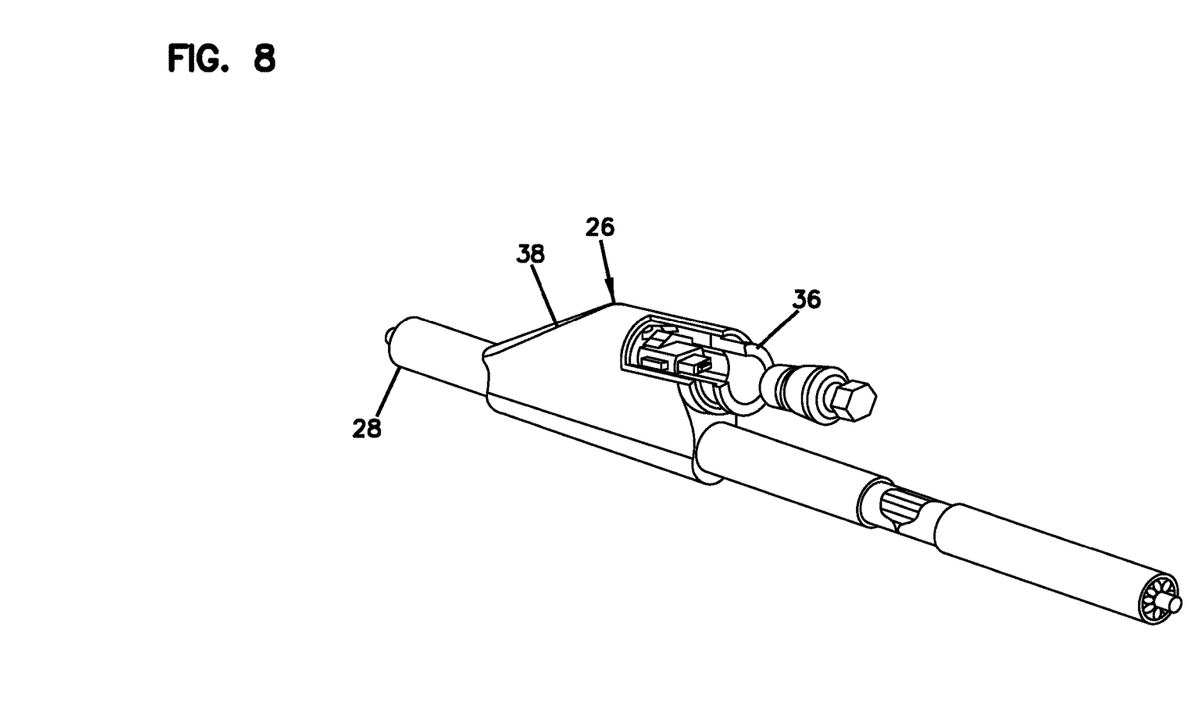
FIG. 8 illustrates an example integrated port-style break-out configuration that can be used as part of a break-out cable incorporated into the network of FIG. 1.

FIG. 8 shows another break-out location 26 where a single-fiber or multi-fiber demateable optical connection location is provided at a port 36 defined within a closure 38 that is factory-installed so as to enclose a mid-span access location of the distribution cable 28. In the case where a single fiber is accessed at the closure 38 from the distribution cable 28, the port 36 can accommodate a single optical fiber. In contrast, where a plurality of optical fibers are accessed at the closure 38, the port 36 can accommodate a plurality of optical fibers coupled to corresponding optical fibers of the distribution cable 28. It will be appreciated that the port 36 is adapted for receiving a fiber optic connector for allowing an optical component (e.g., an indexing component) to be coupled to the optical fiber or fibers corresponding to the port 36.

It will be appreciated that the break-out cable 22 and the indexing component chains 24 can be used to extend a fiber optic network from a designated location. In certain examples, the designated location can include a fiber distribution hub 10 coupled to a central location 12 such as a central office or head end. In certain examples, the fiber distribution hub includes fiber optic splitters and fiber optic connection panels. It will be appreciated that in other examples, the break-out cables 22 may connect directly to a central office or head end, or may be coupled to other types of enclosures, cabinets, pedestals, nodes, or other structures in a fiber optic network. The combination of the factory manufactured break-out cable and one or more indexing component chains provides a cost-effective and efficient architecture for extending the edge of a fiber optic network.

Referring back to FIG. 1, the indexing component chain 24a has a forward-feed end 40 coupled to the break-out location 26a of the break-out cable 22a and a reverse-feed end 42 coupled to the break-out location 26i of the break-out cable 22b. In one example, the break-out location 26a can include a tether terminated by a ruggedized multi-fiber fiber optic connector. In one example, the ruggedized fiber optic connector can include twelve optical fibers. Similarly, the break-out location 26i can also include a tether terminated by a multi-fiber fiber optic connector. Preferably, the multi-fiber fiber optic connector of the break-out location 26i has the same number of optical fibers as the fiber optic connector provided at break-out location 26a. The indexing component chain 24a includes a plurality of indexing components 60 that are daisy-chained together end-to-end.

Figure 2:
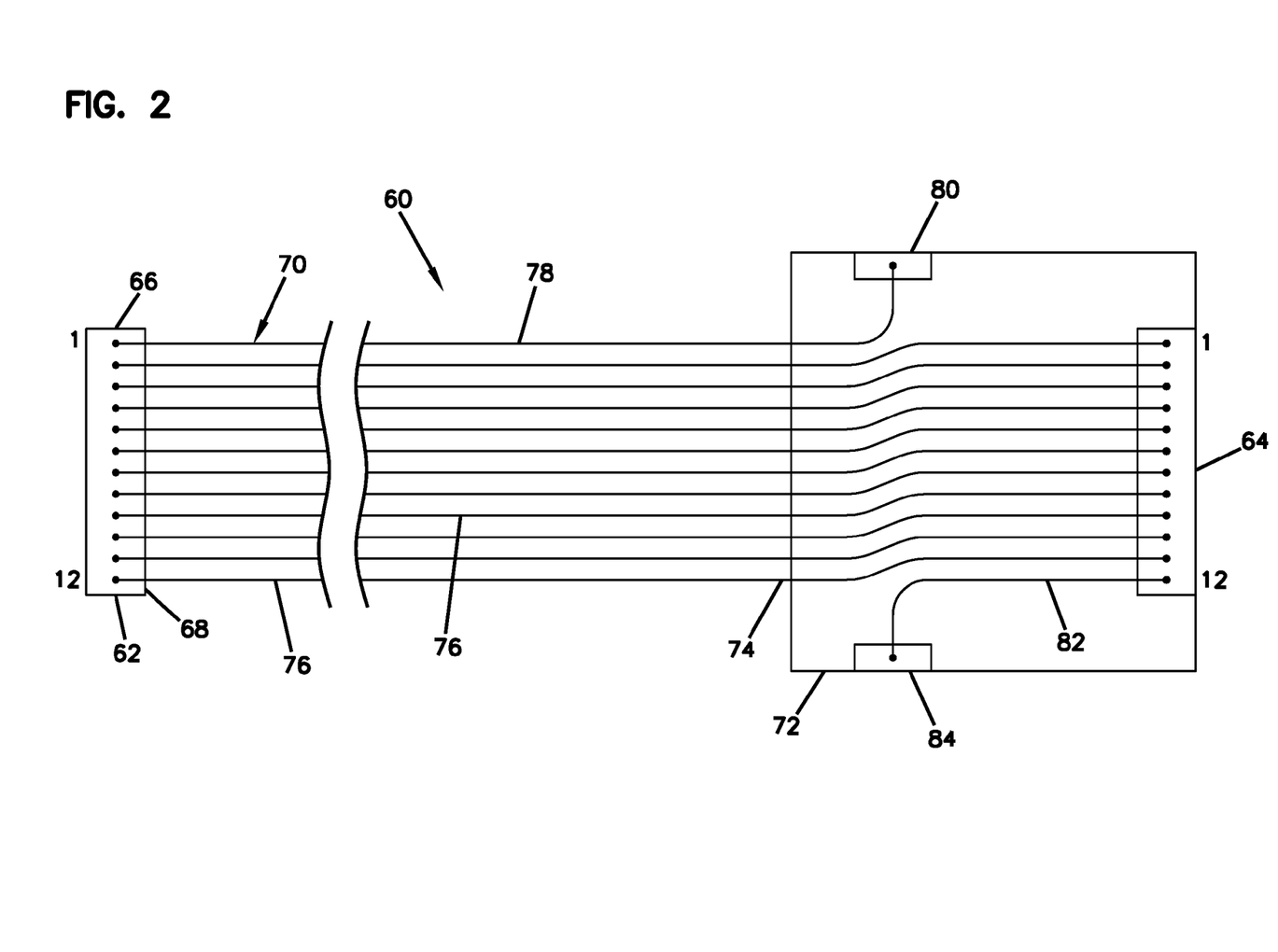
FIG. 2 illustrates an example indexing component that can be used in the fiber optic network architecture of FIG. 1.

Referring now to FIG. 2, an example configuration for each of the indexing components 60 includes a first demateable multi-fiber connection interface 62 defining a plurality of sequential fiber positions and a second demateable multi-fiber connection interface 64 defining a plurality of sequential fiber positions. In the depicted example, the sequential fiber positions include twelve fiber positions arranged in a row. In certain examples, the sequential fiber positions can be defined on a multi-fiber ferrule such as an MPO ferrule. In one example, the first multi-fiber connection interface 62 is provided by a ruggedized fiber optic connection 66 mounted at a first end 68 of a relatively long fiber optic tether cable 70. An indexing housing 72 can be provided at a second end 74 of the tether cable 70. A plurality of indexing optical fibers 76 are connected between the first and second demateable multi-fiber connection interfaces 62, 64 in an indexed configuration. The indexing optical fibers 76 may include eleven optical fibers that are indexed between the first multi-fiber connection interface 62 and the second multi-fiber connection interface 64. For example, the indexing optical fibers 76 are indexed from positions 2-12 of the first multi-fiber connection interface 62 to positions 1-11 of the second multi-fiber connection interface 64. The indexing component 60 also includes a forward drop optical fiber 78 routed from the first fiber position 1 of the first multi-fiber connection interface 62 to a forward drop location 80 and a reverse drop fiber 82 routed from the twelfth fiber position 12 of the second multi-fiber connection interface 64 to a reverse drop location 84.

It will be appreciated that the first multi-fiber connection interface, the second multi-fiber connection interface, the forward drop location and the reverse drop location can all include demateable fiber optic connection locations. In one example, the forward drop location 80, the reverse drop location 84 and the second multi-fiber connection interface 64 are all provided at ruggedized ports defined by the indexing housing 72 that are configured for receiving ruggedized fiber optic connectors. In other examples, the forward drop location 80, the reverse drop location 84 and the second multi-fiber connection interface 64 can all be provided as ruggedized fiber optic connectors mounted at the end of tether cables. The tether cables can be anchored to a fan-out that transitions the indexing optical fibers 76 from the tether cable 70 to a tether cable corresponding to the second multi-fiber connection interface 64, that transitions the forward drop optical fiber 78 from the tether cable 70 to a tether cable corresponding to the forward drop location 80 and that transitions the reverse drop fiber 82 from the tether corresponding to the second multi-fiber connection location 64 to another tether corresponding to the reverse drop location 84. It will be appreciated that dropping optical fibers in both the forward and the reverse direction is optional. In other examples, only a forward drop may be provided. Additionally, while single fibers are shown being dropped, it will be appreciated that multiple fibers can also be dropped at the indexing housing 72. The multiple dropped fibers can be routed to a single demateable multi-fiber fiber optic connection location, to a plurality of demateable multi-fiber fiber optic connection locations, or to a plurality of single-fiber demateable fiber optic connection locations. Additionally, in other examples, one or more passive optical splitters can be provided within the indexing housing 72. In such an example, the forward drop optical fiber 78 and/or the reverse drop optical fiber 82 can be routed to inputs of the optical splitters. The optical splitters can have a plurality of split outputs connected to demateable fiber optic connection locations provided on the indexing housing 72. In still other examples, the forward and reverse drop fibers 78, 82 can be routed to a combiner that combines the forward and reverse drop fibers into a single output that is coupled to a demateable fiber optic connection location to provide line redundancy.

As shown at FIG. 1, drop cables 85 can be used to connect the forward and/or reverse drop locations 80, 84 to subscriber locations. The drop cables 85 can be routed directly to subscriber locations or can be routed to intermediate components such as splitter terminals 87 which are then connected to subscriber locations. With regard to the indexing component chain 24a, optical fibers of the distribution cable of the break-out cable 22b are coupled to the reverse drop locations 84 while optical fibers of the distribution cable of the break-out cable 22a are coupled to the forward drop locations 80. The forward feed end 40 is coupled directly to the break-out location 26a by the first multi-fiber connection interface 62 of the first indexing component 60 in the indexing component chain 24a which couples with a multi-fiber connection interface (e.g., a tether mounted interface such as the connector 34 of FIG. 7 or a port-like interface such as port 36 of FIG. 8).

Additionally, the last indexing component 60 in the indexing component chain 24 is coupled to the break-out location 26i of the break-out cable 22b by a multi-fiber patch cord 89 coupled at one end to the tether of the break-out location 26i and at the other end to the second multi-fiber connection interface 64 of the last indexing component 60 in the indexing component chain 24a. The indexing components 60 are chained together with the second demateable multi-fiber connection location 64 of each indexing component 60 coupled to the first demateable multi-fiber connection location 62 of the subsequent downstream indexing component 60.

The indexing component chain 24b is shown as having a forward feed end 90 optically coupled to the break-out location 26b and a reverse feed end 92 optically connected to the break-out location 26f by a multi-fiber patch cord 94. In the depicted example, the break-out locations 26b, 26f can each include multi-fiber (e.g., twelve fiber) demateable fiber optic connection locations. Preferably but optionally, the multi-fiber fiber optic connection locations are provided by ruggedized multi-fiber fiber optic connectors mounted at the ends of tethers. In one example, the indexing component chain 24b can include a plurality of indexing components 100 which are daisy-chained together end-to-end.

Figure 6:
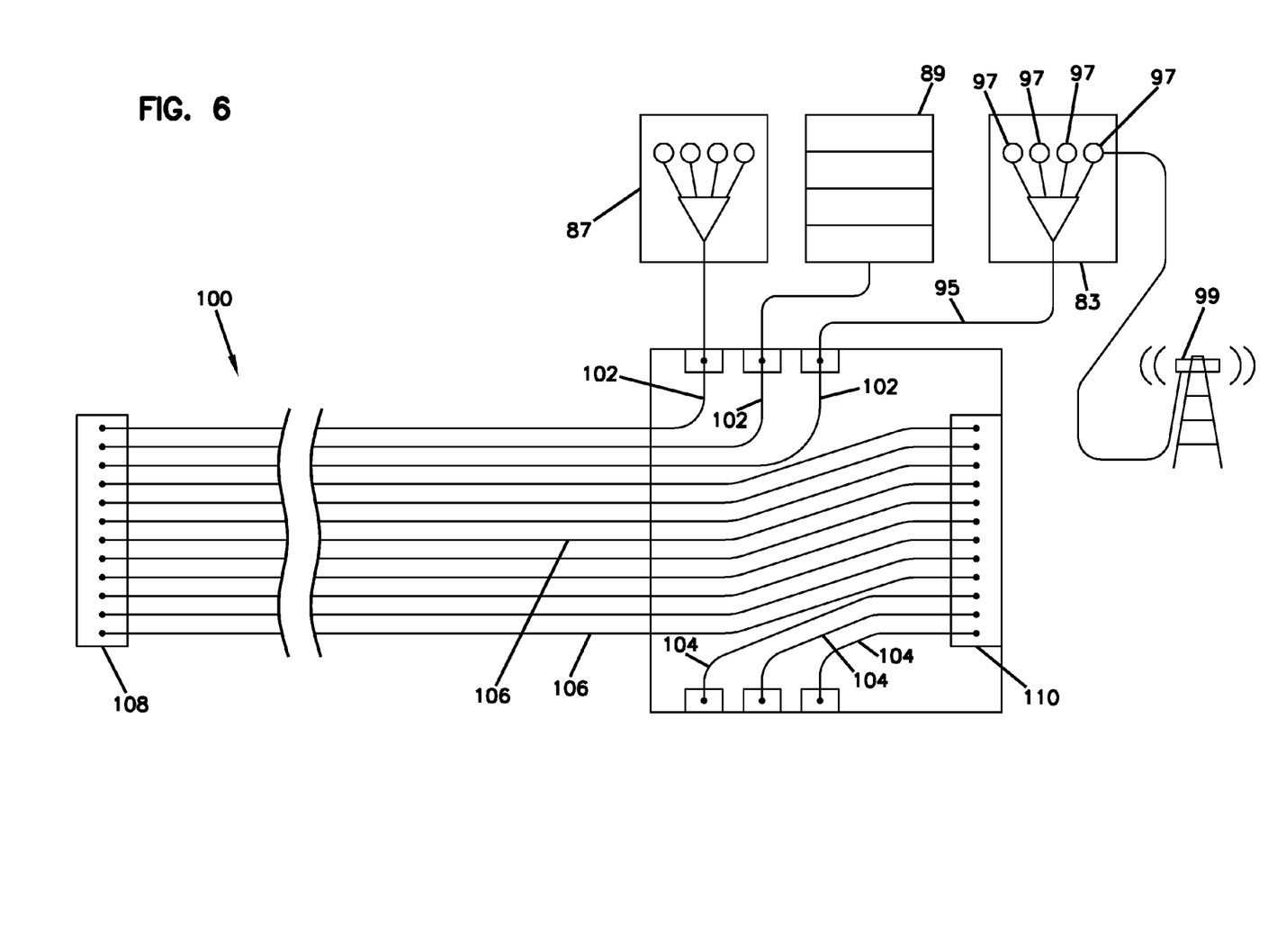
FIG. 6 illustrates a further indexing component that can be used in the fiber optic network architecture of FIG. 1.

Referring now to FIG. 6, the indexing component 100 has the same basic configuration as the indexing component 60 except three optical fibers 102 are dropped in a forward direction and three optical fibers 104 are dropped in a reverse direction. Nine optical fibers 106 are indexed between a first multi-fiber connection interface 108 and a second multi-fiber connection interface 110. Once again, the drop locations and the multi-fiber connection interfaces can all include demateable fiber optic connection interfaces. For the indexing component chain 24b, optic signals from the break-out location 26b are provided to the forward drop locations while optical signals from the break-out location 26f are provided to the reverse drop locations.

While the indexing components described herein include twelve fiber positions at the first and second demateable multi-fiber connection locations, it will be appreciated that other fiber counts (e.g., 8, 24, 26, 48, etc.) can be used as well.

Referring back to FIG. 2, the forward and/or reverse drop locations can be optically coupled to various types of components, structures, locations and devices. For example, the drop locations can be optically coupled to optical splitter terminals 87 that are subsequently coupled to subscriber locations. The drop locations can also be connected directly to subscriber locations 91 such as businesses, multi-dwelling units or other facilities. Additionally, the drop locations can be coupled to wavelength division multi-plexing terminals 83 configured to split optical signals carried by the drop lines 95 into a plurality of signals each having different wavelength bands. The multi-plexed signals are directed from the multi-plexing splitter toward different ports 97 on the wavelength division multiplexer terminal. The ports of the wavelength division multiplexer terminal can be coupled to radio heads 99 provided on an antenna or elsewhere. Thus, drop lines coupled to indexing components in accordance with the principles of the present disclosure can, among other things, be routed to splitter terminals, can provide point-to-point service to subscribers and can be coupled to radio heads for providing wireless communication.

Referring back to FIG. 1, the break-out location 26c can include a single-fiber break-out. For example, the single-fiber break-out can include a ruggedized single-fiber connector 112 mounted at the end of a tether 114. The fiber optic connector 112 can be connected to a splitter component 116.

Figure 3:
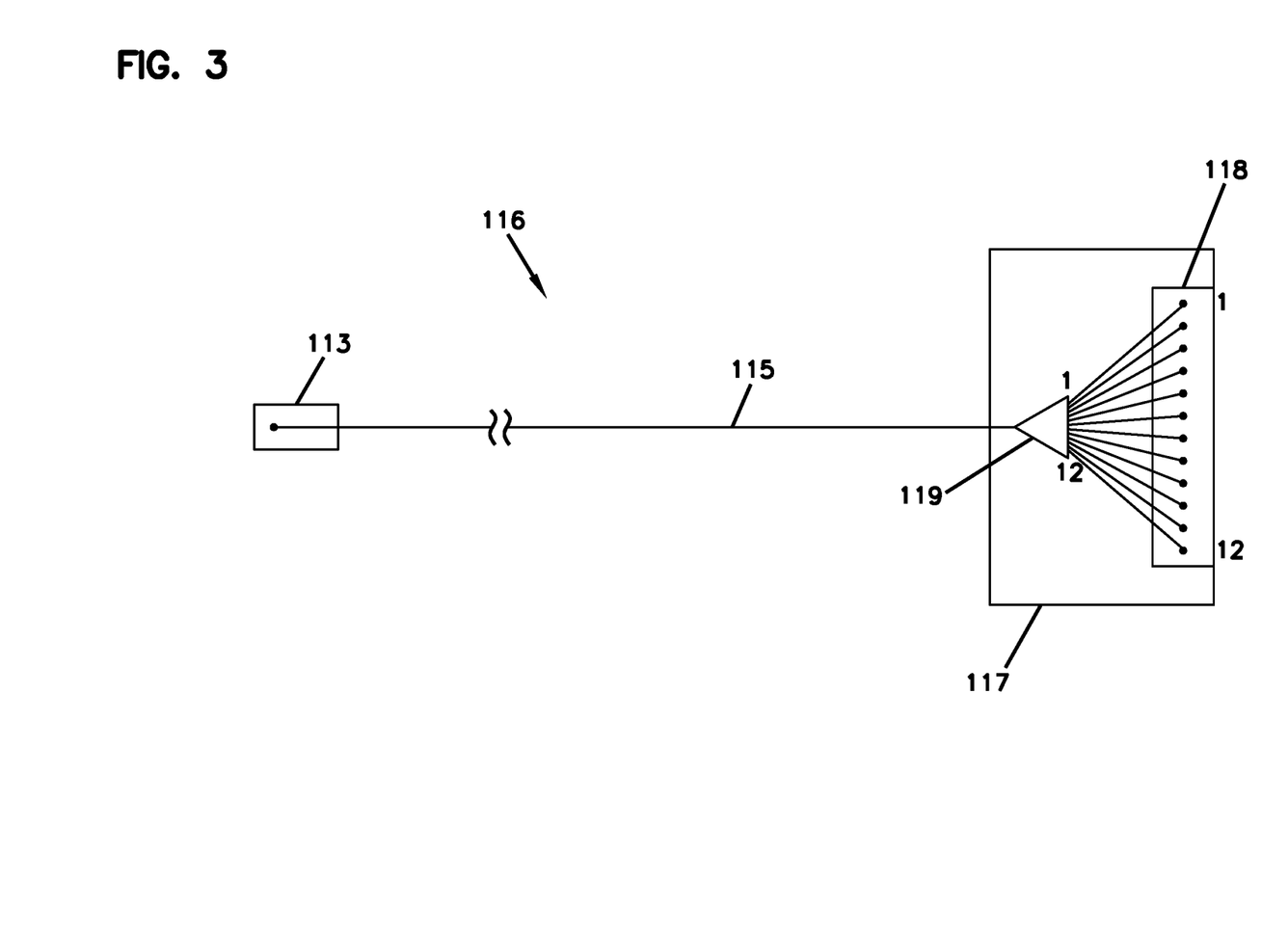
FIG. 3 illustrates an example optical splitting component that can be used in the fiber optic network architecture of FIG. 1.

Referring now to FIG. 3, the splitter component 116 can include a fiber optic tether cable 115 routed to a splitter terminal 117. A connectorized end 113 of the tether cable 115 is optically coupled to the connector 112 of the tether 114. The splitter terminal 117 can include a housing containing internal passive optical power splitter 119 having an input side coupled to a fiber corresponding to the tether cable 115 and an output side coupled to a demateable multi-fiber connection interface 118 (e.g., a ruggedized multi-fiber connection port).

Referring back to FIG. 1, the indexing component chain 24c is coupled to the multi-fiber connection interface 118 of the splitter terminal 116. Thus, the indexing component chain 24c starts at a location remote from the break-out cable 22a. The indexing component chain 24c can include a daisy chain of indexing components 60 or other types of indexing components.

Referring still to FIG. 1, the break-out location 26d can include a demateable multi-fiber fiber optic connection location. In one example, the demateable fiber optic connection location can include a ruggedized multi-fiber fiber optic connector 120 mounted at the end of a tether of the break-out location 26d. In one example, the ruggedized multi-fiber connector 120 can include at least twenty-four fiber positions. The ruggedized multi-fiber fiber optic connector 120 is shown coupled to a collector box component 122.

Figure 4:
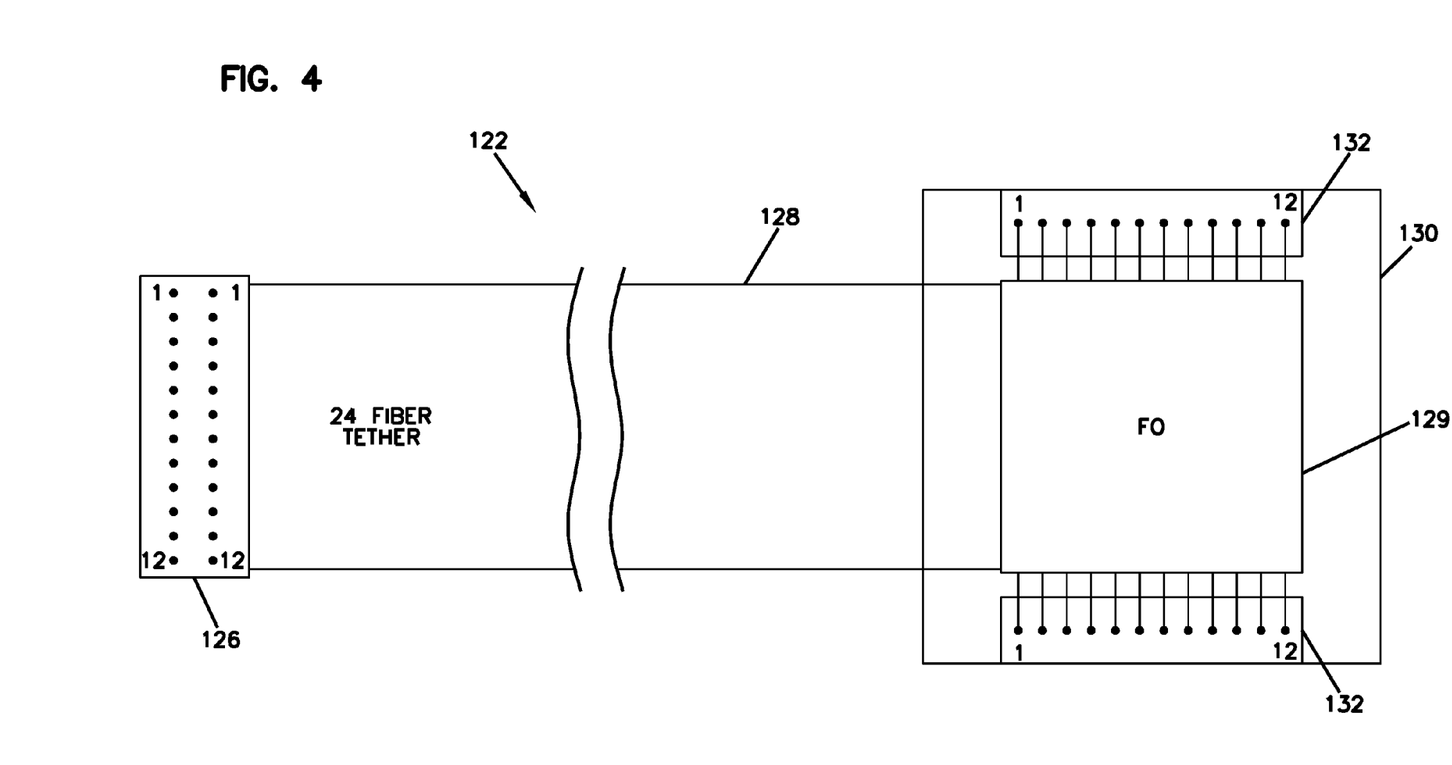
FIG. 4 illustrates an example fan-out component that can be used in the fiber optic network architecture of FIG. 1.

Referring now to FIG. 4, the collector box component 122 includes a ruggedized multi-fiber connector 126 that couples to the ruggedized multi-fiber connector 120. The collector box component 122 also includes a relatively long tether 128 that extends from the ruggedized multi-fiber connector 120 to a fan-out housing 130. At the fan-out housing 130, the optical fibers of the tether 128 are fanned out by a fan-out arrangement 129 to two or more separate demateable multi-fiber fiber optic connection locations 132 (only two are shown but more can be provided depending upon the number of fibers in the main tether and the number of fibers at each multi-fiber fiber optic connection location 132). Each of the multi-fiber fiber optic connection locations 132 can be coupled to a separate indexing component chain.

Referring back to FIG. 1, the indexing component chain 24d is shown coupled to one of the demateable multi-fiber fiber optic connection locations 132. The indexing component chain 24d can include a plurality of the indexing components 60 or other types of indexing components that are daisy-chained together. The collector box component 122 allows the indexing component chains to be initiated at locations remote from the break-out cable 22a. While the ruggedized multi-fiber connector 120 has been described as including forty-eight fibers, it will be appreciated that other examples can include more or fewer fibers.

Referring again to FIG. 1, the break-out location 26e can include a demateable multi-fiber fiber optic connection location. In one example, the demateable multi-fiber fiber optic connection location can include a ruggedized multi-fiber fiber optic connector 140 mounted at the end of a tether 142 of the break-out location 26e. The indexing component chain 24e includes a plurality of indexing components 150.

Figure 5:
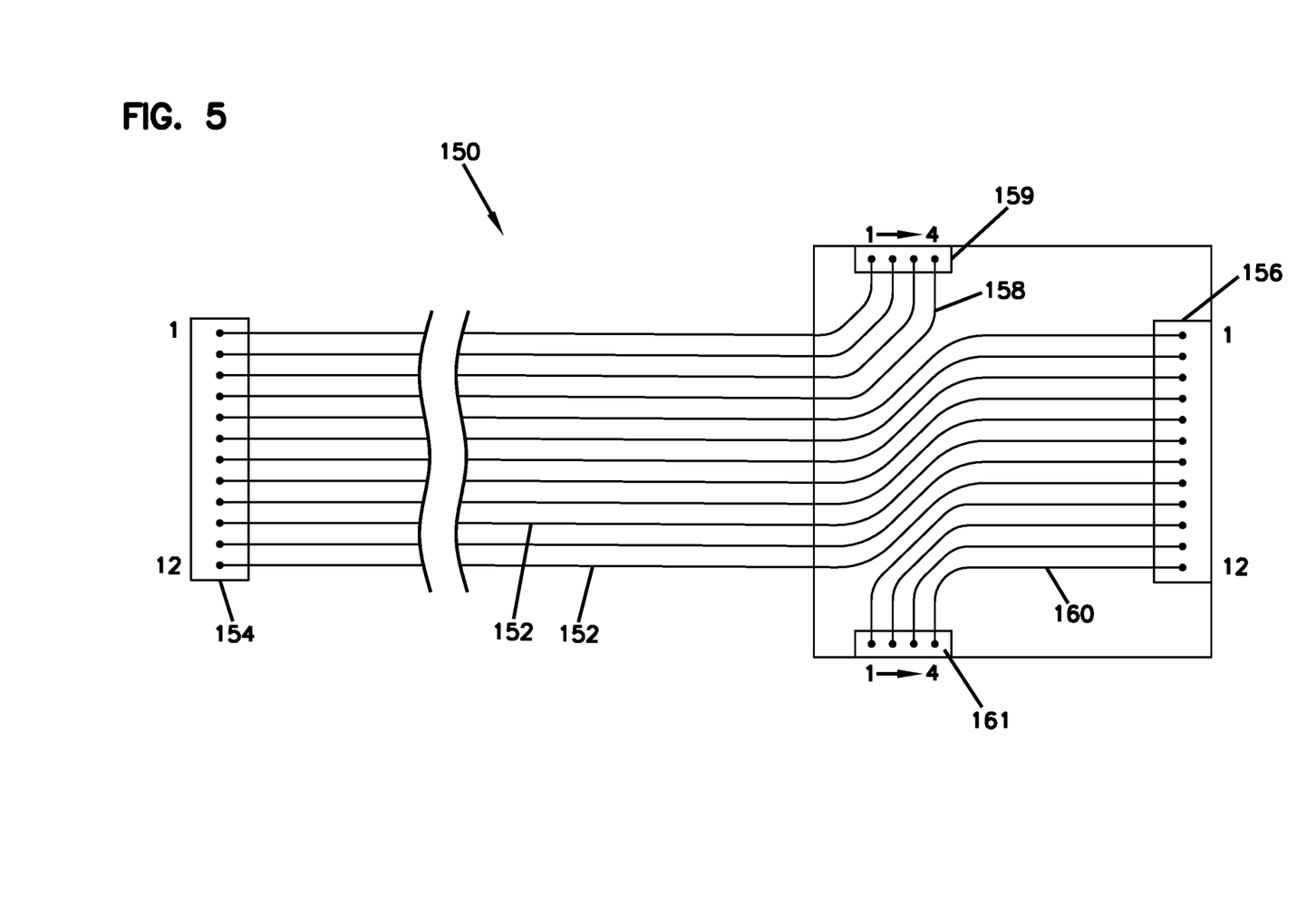
FIG. 5 illustrates another indexing component that can be used in the fiber optic network architecture of FIG. 1.

Referring now to FIG. 5, each of the indexing components 150 includes indexing fibers 152 indexed between first and second demateable multi-fiber fiber optic connection locations 154, 156. The indexing component also includes a plurality of forward drop fibers 158 and a plurality of reverse drop fibers 160. The forward drop fibers 158 are routed to a forward drop location 159 that can include a demateable multi-fiber fiber optic connection location. Similarly, the reverse drop fibers 160 can be routed to a reverse drop location 161 that can include a demateable multi-fiber connection location.

Referring back to FIG. 1, the demateable multi-fiber fiber optic connection locations 154, 156 can be optically connected to components such as a drop terminal 165 (e.g., a multi-service terminal which fans out the optical fibers and routs the optical fibers to the demateable fiber optic connection locations without power splitting) having a plurality of demateable single-fiber fiber optic connection locations.

Still referring to FIG. 1, the break-out location 26g can include a demateable multi-fiber fiber optic connection location. In one example, the demateable fiber optic connection location can include a ruggedized multi-fiber fiber optic connector 220 mounted at the end of a tether of the break-out location 26g. The ruggedized multi-fiber fiber optic connector 220 is shown coupled to a multi-fiber patch cord 222 having ends connectorized by multi-fiber connectors. As depicted, a forward end of the indexing component chain 24g is shown coupled to the break-out location 26g by the patch cord 222. The indexing component chain 24g can include a plurality of the indexing components 60 or other types of indexing components that are daisy-chained together. The patch cord 222 allows the indexing component chains to be initiated at locations remote from the break-out cable 22a.

Referring again to FIG. 1, the break-out location 26h can include a demateable multi-fiber fiber optic connection location. In one example, the demateable multi-fiber fiber optic connection location can include a ruggedized multi-fiber fiber optic connector 240 mounted at the end of a tether 242 of the break-out location 26h. The indexing component chain 24h includes a plurality of indexing components 250.

Figure 9:
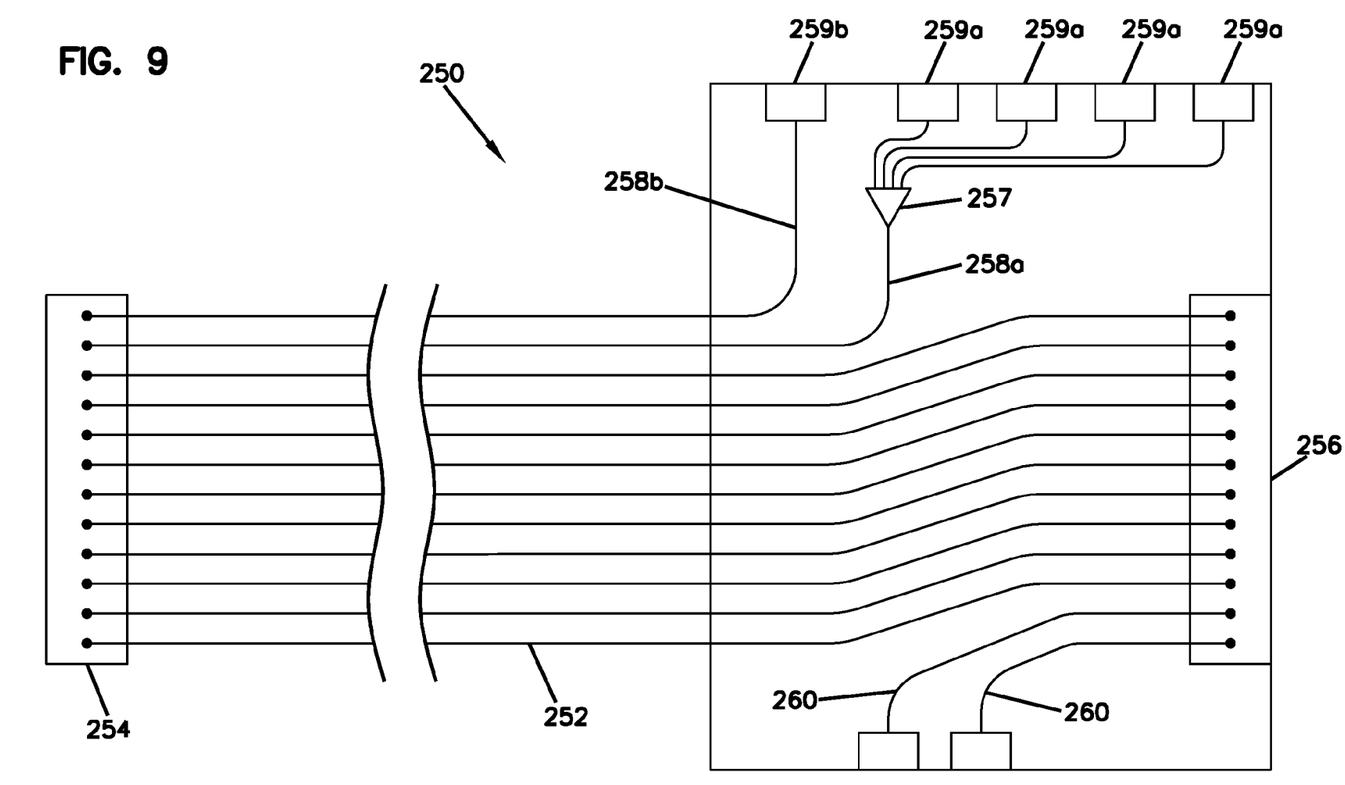
FIG. 9 depicts another indexing component that can be used in the fiber optic network architecture of FIG. 1.

Referring now to FIG. 9, each of the indexing components 250 includes indexing fibers 252 indexed between first and second demateable multi-fiber fiber optic connection locations 254, 256. The indexing component also includes a plurality of forward drop fibers 258a, 258b and a plurality of reverse drop fibers 260. The forward drop fiber 258a is routed to a passive optical power splitter 257 located within a terminal housing of the indexing component 250. Outputs of the passive optical power splitter 257 are routed to forward drop locations 259a and the forward drop fiber 258b is routed to a forward drop location 259b. The forward drop locations 259a, 259b can include demateable fiber optic connection locations.

Referring back to FIG. 1, the reverse drop fibers 260 can be routed to a reverse drop location 261 that can include a demateable connection location. The demateable fiber optic connection locations can be optically connected to components such as a splitter terminals and drop terminals, and can also be connected directly to subscriber locations 263.

Figure 10:
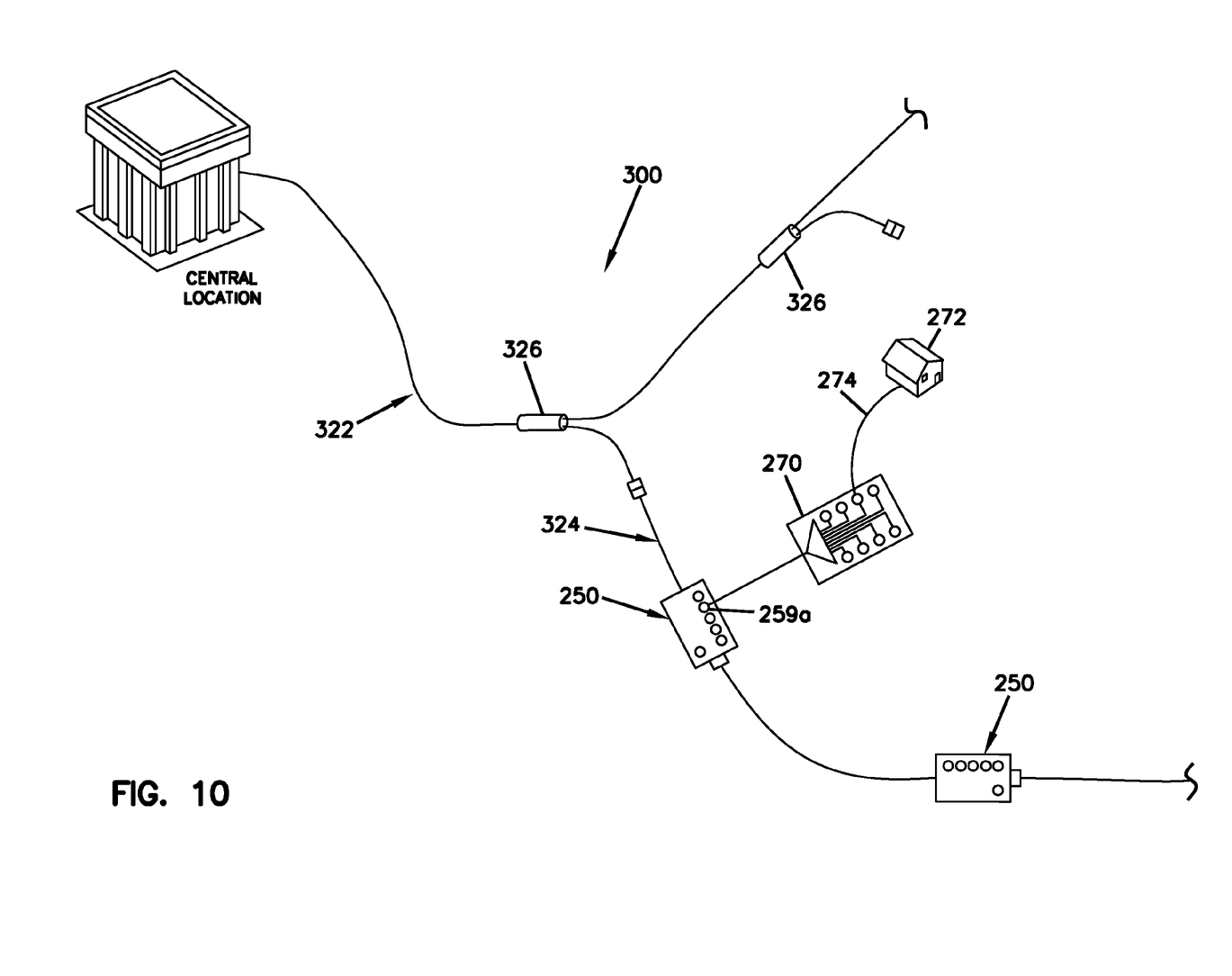
FIG. 10 depicts another fiber optic network architecture in accordance with the principles of the present disclosure.

FIG. 10 depicts another fiber optic network 300 in accordance with the principles of the present disclosure. The fiber optic network 300 has a distributed split architecture where optical splitting is not provided at a hub location or node location, but instead is distributed out further in the network closer to the network edge. The fiber optic network 300 includes one or more break-out cables 322 that can have the same construction described with respect to the break-out cables 22. The break-out cables 322 include break-out locations 326. One or more indexing chains can be branched directly or indirectly from one or more of the break-out locations. The indexing chains can support a distributed-split architecture (e.g., a cascaded-split architecture with multiple split locations cascaded in an upstream-downstream orientation relative to one another).

An indexing chain 324 is shown branching from one of the break-out locations 326. The indexing chain 324 includes a daisy chain of the indexing components 250. The passive optical splitters 257 of the indexing components 250 can provide a first optical power splitting. The drop locations 259a can be coupled to splitter terminals 270 which provide second optical power splitting downstream from the first optical power splitting. Drop locations of the splitter terminals 270 can be coupled to subscriber locations 272 by drop cables 274. It will be appreciated that the first power splitting is shown as 1×4 splitting and the second power splitting is shown as 1×8 power-splitting. In other examples, alternative split ratios can be used (e.g., 1×16, 1×32, etc.) and the order of the optical power splits in the cascade can be varied (e.g., the 1×4 split can be downstream from the 1×8 split or vice-versa, etc.).

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A system for building an architecture for a fiber optic network, the system comprising:
   a factory manufactured fiber optic break-out cable including a main fiber distribution cable and a plurality of factory integrated mid-span access locations positioned along the length of the main fiber distribution cable, the mid-span access locations including demateable fiber optic connection locations; and
   a plurality of indexing components adapted to be daisy chained together to form a chain of indexing components and adapted to be optically coupled to one or more of the demateable fiber optic connection locations at one or more of the mid-span access locations of the factory manufactured fiber optic break-out cable;

wherein the demateable fiber optic connection locations of the factory manufactured fiber optic break-out cable include a multi-fiber demateable fiber optic connection location, and wherein the indexing components each include:
a first multi-fiber demateable fiber optic connection location optically coupled to a demateable fiber optic connection location of a mid-span access location, the first multi-fiber demateable fiber optic connection location including a first plurality of sequential fiber positions;
a second multi-fiber demateable fiber optic connection location including a second plurality of sequential fiber positions;
a plurality of indexing fibers indexed between the first plurality of sequential fiber positions and the second plurality of sequential fiber positions;
at least one of the sequential fiber positions of the first plurality of sequential fiber positions being optically coupled to a forward drop location of the indexing component, the forward drop location including a demateable fiber optic connection interface; and
at least one of the sequential fiber positions of the second plurality of sequential fiber positions being optically coupled to a reverse drop location of the indexing component, the reverse drop location including a demateable fiber optic connection interface.

2. The system of claim 1, wherein the first multi-fiber demateable fiber optic connection location is adapted to be directly connected to the demateable fiber optic connection location of the mid-span access location.

3. The system of claim 1, further comprising a passive optical splitter component for optically coupling the first multi-fiber demateable fiber optic connection location to the demateable fiber optic connection location of the mid-span access location.

4. The system of claim 1, further comprising a multi-fiber fan-out component for optically coupling the first multi-fiber demateable fiber optic connection location to the demateable fiber optic connection location of the mid-span access location.

5. The system of claim 1, further comprising a multi-fiber patch cord for optically coupling the first multi-fiber demateable fiber optic connection location to the demateable fiber optic connection location of the mid-span access location.

6. A fiber optic network comprising:
a factory manufactured fiber optic break-out cable including a main fiber distribution cable and a plurality of factory integrated mid-span access locations positioned along the length of the main fiber distribution cable, the mid-span access locations including demateable fiber optic connection locations; and
a plurality of indexing components daisy chained together to form a chain of indexing components, the chain of indexing components having a first end optically coupled to one of the demateable fiber optic connection locations at one of the mid-span access locations of the factory manufactured fiber optic break-out cable;
wherein the demateable fiber optic connection locations of the factory manufactured fiber optic break-out cable include a multi-fiber demateable fiber optic connection location, and wherein the indexing components each include:
a first multi-fiber demateable fiber optic connection location optically coupled to a demateable fiber optic connection location of a mid-span access location, the first multi-fiber demateable fiber optic connection location including a first plurality of sequential fiber positions;
a second multi-fiber demateable fiber optic connection location including a second plurality of sequential fiber positions;
a plurality of indexing fibers indexed between the first plurality of sequential fiber positions and the second plurality of sequential fiber positions;
at least one of the sequential fiber positions of the first plurality of sequential fiber positions being optically coupled to a forward drop location of the indexing component, the forward drop location including a demateable fiber optic connection interface; and
at least one of the sequential fiber positions of the second plurality of sequential fiber positions being optically coupled to a reverse drop location of the indexing component, the reverse drop location including a demateable fiber optic connection interface.

7. The fiber optic network of claim 6, wherein the first end of the chain of indexing components is optically connected directly to the demateable fiber optic connection location at one of the mid-span access locations of the factory manufactured break-out cable.

8. The fiber optic network of claim 6, wherein the first end of the chain of indexing components is optically connected indirectly to the demateable fiber optic connection location at one of the mid-span access locations of the factory manufactured break-out cable.

9. The fiber optic network of claim 8, wherein the first end of the chain of indexing components is optically connected indirectly to the demateable fiber optic connection location at one of the mid-span access locations of the factory manufactured break-out cable by an optical splitting component.

10. The fiber optic network of claim 8, wherein the first end of the chain of indexing components is optically connected indirectly to the demateable fiber optic connection location at one of the mid-span access locations of the factory manufactured break-out cable by a patch cord.

11. The fiber optic network of claim 8, wherein the first end of the chain of indexing components is optically connected indirectly to the demateable fiber optic connection location at one of the mid-span access locations of the factory manufactured break-out cable by a fan-out component.

12. The fiber optic network of claim 6, wherein a second end of the chain of indexing components is optically connected to another one of the demateable fiber optic connection locations at another one of the mid-span access locations of the factory manufactured break-out cable.

13. The fiber optic network of claim 6, wherein a second end of the chain of indexing components is optically connected to a demateable fiber optic connection location at a mid-span access location of another factory manufactured break-out cable.

14. The fiber optic network of claim 6, wherein the indexing components include passive optical splitters.

15. The fiber optic network of claim 6, wherein the chain of indexing components supports a distributed split architecture.

* * * * *